UNITED STATES PATENT OFFICE.

JONATHAN SEWELL, OF ANACONDA, MONTANA.

PACKING COMPOSITION.

1,103,441. Specification of Letters Patent. Patented July 14, 1914.

No Drawing. Application filed March 3, 1913. Serial No. 751,764.

*To all whom it may concern:*

Be it known that I, JONATHAN SEWELL, a citizen of the United States, residing at Anaconda, in the county of Deerlodge and State of Montana, have invented a new and useful Packing Composition, of which the following is a specification.

The object of my invention is to produce a plastic, semi-metallic packing for piston-rods, valve-stems, steam expansion joints, stuffing boxes of any character, and in fact, for any available purpose whatsoever, which will be practically unaffected by heat; one containing a minimum proportion of metal; one which can be readily molded by hand; one which will permit ready renewal of old packings by the mere addition thereto of fresh packing, thus avoiding waste; one which is durable and inexpensive; one which may be manufactured without the employment of special tools; one which is smooth and devoid of grit; one which does not melt under high temperatures owing to the comparatively low proportion of its metal content; and one possessing further and other advantages flowing from the nature of the ingredients composing the same.

My composition contains the following ingredients, combined by weight in the proportions stated, to-wit:—

| | |
|---|---|
| Anti-friction metal | 54 parts. |
| Flake graphite | 18 parts. |
| Cylinder oil | 18 parts. |
| Asbestos cement | 6 parts. |
| Asbestos fiber | 4 parts. |

The average anti-friction metal employed has a composition approximating 15 parts tin, 17 parts antimony, and 68 parts lead, all by weight, though obviously I do not desire to be restricted to anti-friction metal of this precise composition.

The manner of compounding and preparing the packing is substantially as follows:— The anti-friction metal is pulverized by any suitable method. The cylinder oil, graphite, asbestos cement and asbestos fiber are mixed together in any manner and the pulverized metal is then added thereto, the whole being worked into a plastic mass by hammering or working through a suitable mill. The asbestos cement is used as an absorber and retainer for the cylinder oil, the result being a self-lubricating packing. The packing is steam and air tight and appears to fulfil all the requirements expected of a perfect packing.

Analyzed in the light of the function and purpose subserved by the several ingredients, the composition may be said to contain a metallic base (anti-friction metal), a lubricant (cylinder oil), an absorber or retainer for said lubricant (asbestos cement) and a heat resisting component (asbestos fiber), the whole combining in a single composition, the virtues characterizing the individual components. The graphite as is well understood, is a mineral possessing inherent lubricating qualities, in the present instance supplementing the cylinder oil lubricant retained by the asbestos cement. Cylinder oils as well understood in the art have generally (though not necessarily) a petroleum base.

Having described my invention, what I claim is:—

The herein described composition of matter for use as a packing, consisting by weight of substantially fifty-four parts of pulverized anti-friction metal, eighteen parts of flake graphite, eighteen parts of cylinder oil, six parts of asbestos cement, and four parts of asbestos fiber, and forming a plastic mass.

In testimony whereof I affix my signature, in presence of two witnesses.

JONATHAN SEWELL.

Witnesses:
M. E. RUTLEDGE,
U. A. GARRED.